June 28, 1955 S. W. HAYES Re. 24,030

BUMPING POST

Original Filed May 31, 1940 6 Sheets-Sheet 1

Inventor
Stanley W. Hayes
By
Williams, Bradbury & Stickle
Attys.

BUMPING POST

Original Filed May 31, 1940 6 Sheets-Sheet 2

Inventor:
Stanley W. Hayes
By Williams, Bradbury & Hinkle
Attys

BUMPING POST

Original Filed May 31, 1940 6 Sheets-Sheet 3

Inventor:
Stanley W. Hayes
By Williams, Bradbury & Hinkle
Attys.

June 28, 1955 S. W. HAYES Re. 24,030

BUMPING POST

Original Filed May 31, 1940 6 Sheets-Sheet 4

Inventor:
By Stanley W. Hayes
Williams, Bradbury & Hubbard, Attys.

Inventor
Stanley W. Hayes
By
Williams, Bradbury & Hunkle
Attys.

BUMPING POST

Original Filed May 31, 1940 6 Sheets-Sheet 6

Inventor.
Stanley W. Hayes
By
Williams, Bradbury & Huckle
Attys.

United States Patent Office

Re. 24,030
Reissued June 28, 1955

24,030

BUMPING POST

Stanley W. Hayes, Wayne Township, near Richmond, Wayne County, Ind., assignor to Hayes Track Appliance Company, Richmond, Ind., a corporation of Indiana

Original No. 2,308,877, dated January 19, 1943, Serial No. 338,003, May 31, 1940. Application for reissue April 13, 1955, Serial No. 501,221

34 Claims. (Cl. 104—254)

Matter enclosed in heavy brackets [ ] appears in the original patent but forms no part of this reissue specification; matter printed in italics indicates the additions made by reissue.

The present invention relates to improvements in bumping posts of the type in which a bumper head, located between the rails, is supported by the road bed by tension and compression means.

The object of the present invention is, in general, to provide an easily constructed and assembled, yet low cost, bumping post adapted particularly for use with heavy rails and one that is applicable without change to rails of various heights.

One of the primary features of the present invention resides in the provision of a new and improved tension unit comprising a single bar. This bar is curved at the top and according to another feature of the invention is provided with a bumper head comprising a striking plate welded thereto.

A further object of the present invention is to provide a bumping post comprising separable tension and compression units adapted to be connected together in installation by an interlocking connection.

A further object of the invention is to provide a simple arrangement for interconnecting the tension and compression units to form a complete bumping post assembly as by means of a slot and wedge.

A further object of the present invention is to provide a bumping post wherein the tension bar is connected directly to a cross piece located underneath the rails, whereby the vertical stresses are carried directly to the bases of the rails instead of into a joint and then into a cross piece, as in prior art bumping posts. An advantage of this construction is that bolts utilized to secure the lower end of the tension unit to the track rails are subjected only to horizontal stresses.

A further object of the present invention is to provide simplified anchoring means for the bumping post.

A still further object of the present invention is to provide improved compression and tension track joints.

Other objects and advantages of the present invention will become apparent from the ensuing description, in the course of which reference is had to the accompanying drawings, in which.

Figure 1:
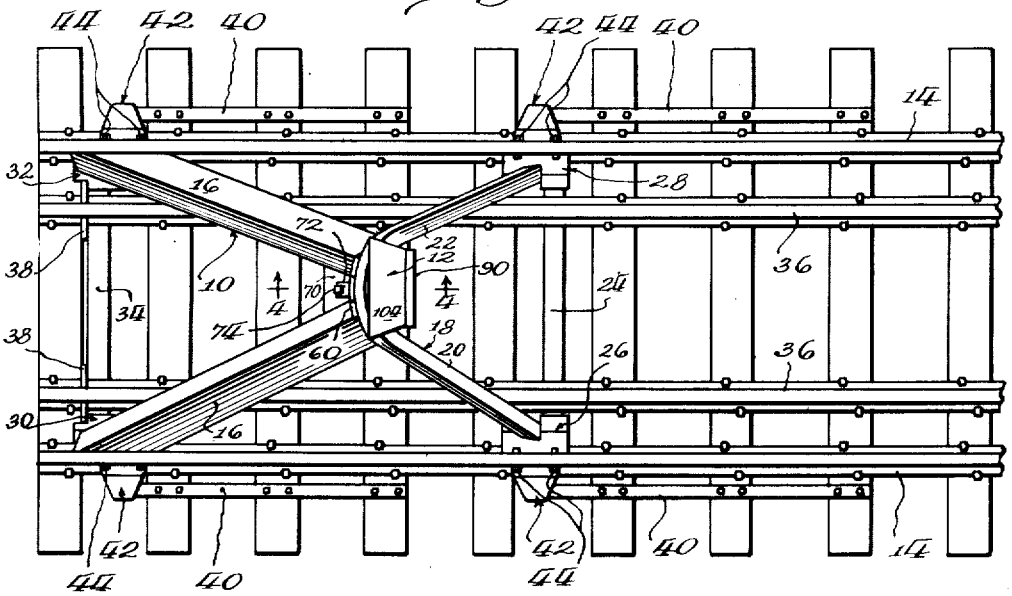
Fig. 1 is a plan view of the bumping post of the present invention showing it installed on a track.
Figure 2:
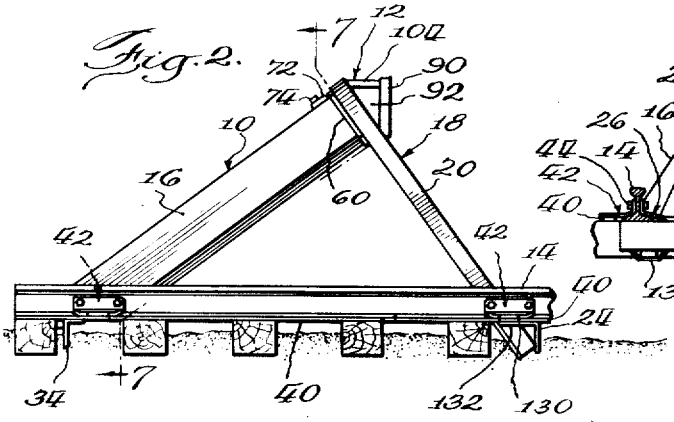
Fig. 2 is a side elevation thereof.
Figure 3:
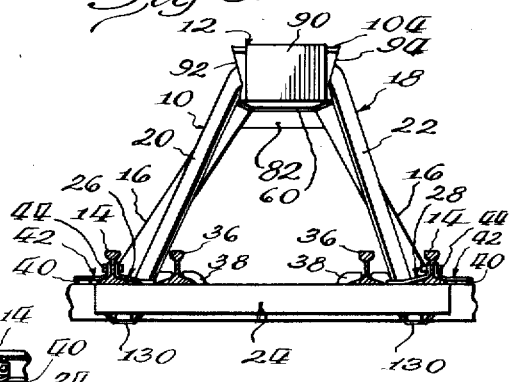
Fig. 3 is a front elevation thereof.

Referring now to the figures, and particularly to Figs. 1 to 3, inclusive, it may be seen that the bumping post, indicated generally by reference character 10, comprises a bumper head 12 supported slightly off center with respect to a pair of rails 14 by a pair of compression members 16 diverging outwardly, downwardly and rearwardly from the bumper head and an integral tension member indicated as a whole by reference character 18 and comprising portions 20 and 22 diverging downwardly, outwardly and forwardly from the bumper head. One of the important features of the present invention resides in constructing the tension member from a single piece of metal, as hereinafter described in greater detail.

Another of the important features of the present invention resides in connecting the tension bar directly to a cross piece 24 so that the vertical stresses resulting from the impact of a car against the bumping post are transmitted directly to the bases of the rails instead of into a joint and then to the bases of the rails. The lower ends of the tension member are also connected to track fixture plates 26 and 28 which are substantially identical, as will appear hereinafter, except for slight changes necessitated by off-center support of the bumper head and which are adapted to be secured to the rail webs, by suitable means such as bolts. The construction is such that the bolts are subject only to horizontal stresses.

According to another feature of the present invention, the compression members 16 are secured directly to compression track fixture plate 30 and 32 which are, in turn, secured to a compression cross piece 34.

In order to control the tendency of the track to rise at the point of tension connection to the road bed and to divide the outward sidewise rail spreading thrust on the compression base members, track stiffening structure is built into the track at the bumping post location. This structure consists of the previously mentioned cross pieces 24 and 34 and longitudinal members. In the illustrated embodiment the longitudinal members comprise a pair of intermediate rails 36 located adjacent the track rails 14 and extending a substantial distance along the track. They are secured to the ties by spikes and to the compression cross piece 34 by rail clips 38 of novel construction and secured to the cross piece in a novel manner to be described in greater detail hereinafter.

Additional stiffening is provided by anchor bars 40 secured to rail brackets 42, in accordance with another feature of this invention. The bars are spiked to the ties outside the rails 14 and the brackets are secured to the rails by suitable fastening means preferably such as the bolts 44 utilized also to secure the compression and tension track fixtures to the rails.

The compression unit is best illustrated in Figs. 4 and 6 to 9, inclusive, from which it may be seen to comprise a number of structural elements secured together, as by welding, to form a single unit. The compression members 16 are relatively heavy structural elements and preferably channels having their open sides facing each other. The lower ends of the compression members 16 are configured so as to seat on the upper surfaces of the compression track fixture plates 30 and 32 so that the members may be welded directly to the plates.

The track fixture plates comprise apertured vertically disposed portions 50 whereby they may be secured to the webs of the rails 14 by the previously mentioned bolts 44; intermediate inclined portions 52 overlying the surfaces of the inner inclined upper surfaces of the rail bases; and horizontal portions 54 welded directly to the cross piece 34. The track fixture plates are also configured so that they may be readily attached to rails of various shapes. Track fixture plates of the construction described and which are adapted to be welded to cross pieces in the above described manner, are disclosed and claimed in my copending application Serial No. 301,717, filed October 28, 1939.

Figure 8:
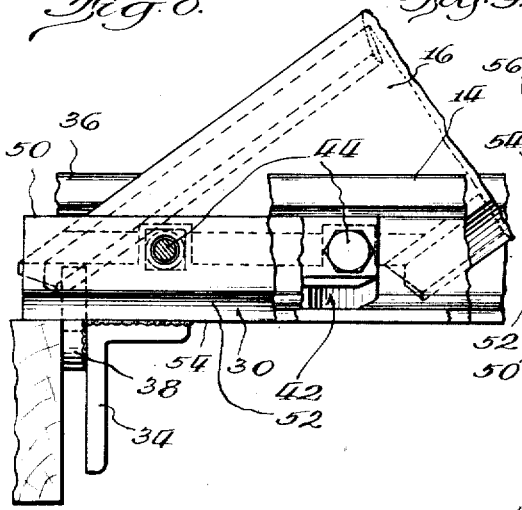
Fig. 8 is a fragmentary side elevation of the compression joint, partly broken away to illustrate details of the joint as well as of the anchoring means.
Figure 9:
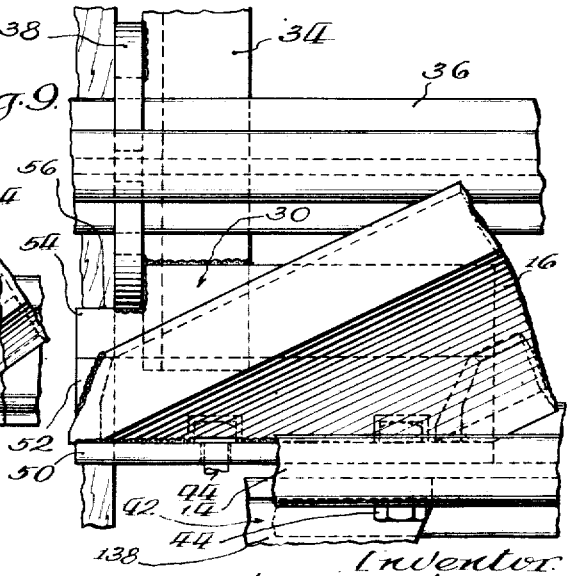
Fig. 9 is a plan view of the structure illustrated in Fig. 8.

The cross piece 34 is preferably made of angle iron, as best illustrated in Fig. 8, so that the rail base encircling clips 38 may be welded to the front face of the vertical downwardly extending portion thereof. According to the present invention the rail clips 38 are of integral construction so that they may be readily welded to the cross piece, and are located between the latter and a rail tie, as illustrated in Fig. 8. Consequently, there is little danger of the rail clips being damaged, and furthermore, the clips assist in transmitting forces resulting from the impact of cars on the bumping post to the track bed. The rigidity of the structure is enhanced by providing the track fixture plates with cut-away corners, as indicated by the reference character 56 in Fig. 9, so that the track fixture plates may be welded not only to the cross piece, but also to the rail clips.

To facilitate proper location of the tension and compression units with respect to each other as well as the interconnection thereof to form the bumping post assembly, one of the units is provided with an aperture and the other with a projection adapted to extend into the aperture. In the instant embodiment the end of the compression unit is closed by means of a plate 60, hereinafter termed a "middle plate," that is apertured as indicated by reference character 62 for the reception of a connecting plate 64 (see particularly Figs. 4 and 6) forming a part of the tension unit. When the tension and compression units are to be interlocked, the two are brought into the positional relationship shown in Fig. 4, so that the connecting plate 64 of the tension unit may be inserted into the aperture 62 in the compression unit. The plate 60 is welded to the upper end of the compression members, which are cut at an angle such that the plate is disposed at an angle corresponding to the angle of inclination of the tension unit.

The units are securely locked together by means of a wedge 66 adapted to be inserted into an aperture 68, formed in a top gusset plate 70 welded to the upper inner edges of the U-shaped channels from which the compression members 16 are made, and an inclined aperture 71 in the connecting plate 64. The upper end of the wedge is provided with an apertured portion 72 extending substantially at right angles to the main portion thereof for the reception of suitable securing means, such as the bolt and nut indicated by reference character 74. The top gusset plate is provided wtih a second aperture 76 through which the bolt 74 extends.

To assist in the proper connection of the tension and compression units, the lower end of the wedge 66 is formed with an inclined surface 78 for cooperative association with the inclined aperture 71.

The upper end of the compression unit is strengthened by a bottom gusset plate 82 apertured at 84 in alignment with the wedge 66 so that the latter may be driven out to permit the post to be disassembled. The upper end of the compression unit is additionally strengthened by substantially triangular braces 86 welded to the middle plate 60 and the bottom portions of the channel-shaped compression members 16, as best illustrated in Figs. 4 and 6.

Further to facilitate proper location of the compression and tension units, as well as to assist in maintaining the two in proper relationship, a somewhat oval-shaped plate 88 is welded to the outer side of the middle plate 60 immediately above the aperture 62 therein. The plate 88 is of a width such that the lower side of the upper end of the tension member 18 rests thereon, as shown in Fig. 4.

Figure 4:
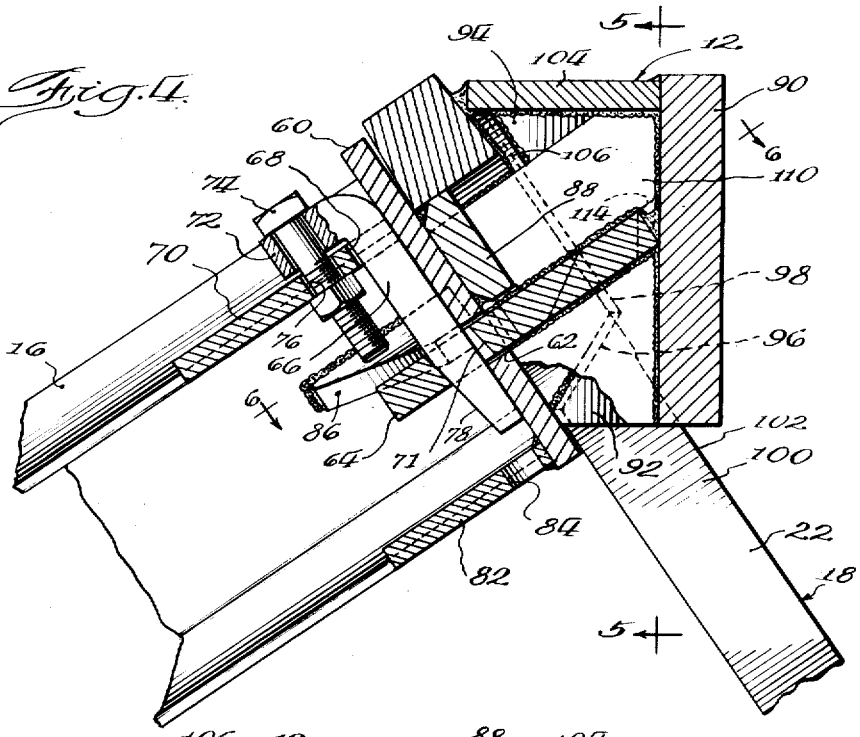
Fig. 4 is an enlarged fragmentary vertical cross-sectional view taken along the line 4—4 of Fig. 1, illustrating the details of the interlocking connection between the tension and compression units, the manner in which these two units are secured by a slot and wedge connection, and details of the bumper head.
Figure 5:
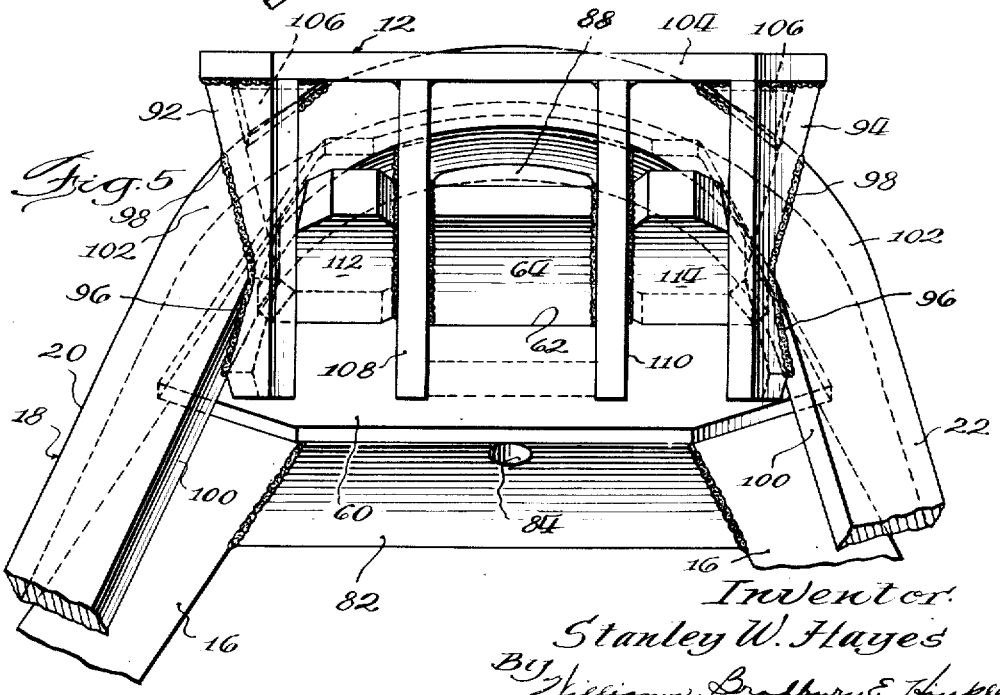
Fig. 5 is a vertical cross-sectional view taken along the line 5—5 of Fig. 4, and illustrating particularly the details of a bumper head.
Figure 6:
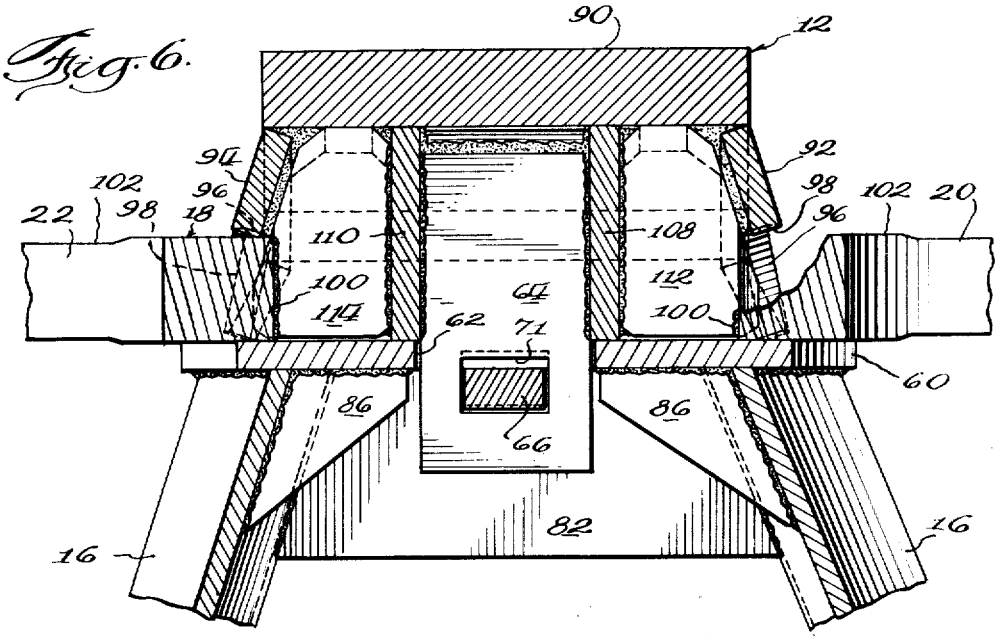
Fig. 6 is a cross-sectional view taken along the line 6—6 of Fig. 4.
Figure 16:
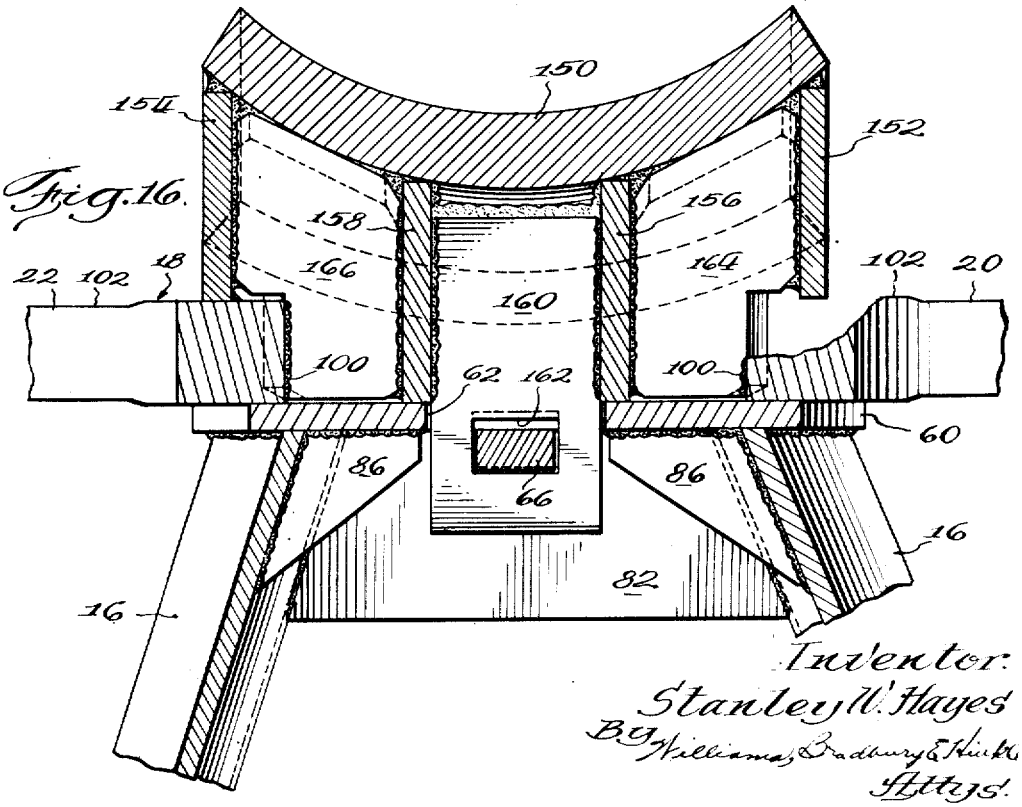
Fig. 16 is a cross-sectional view taken along the line 16—16 of Fig. 15.
Figure 7:
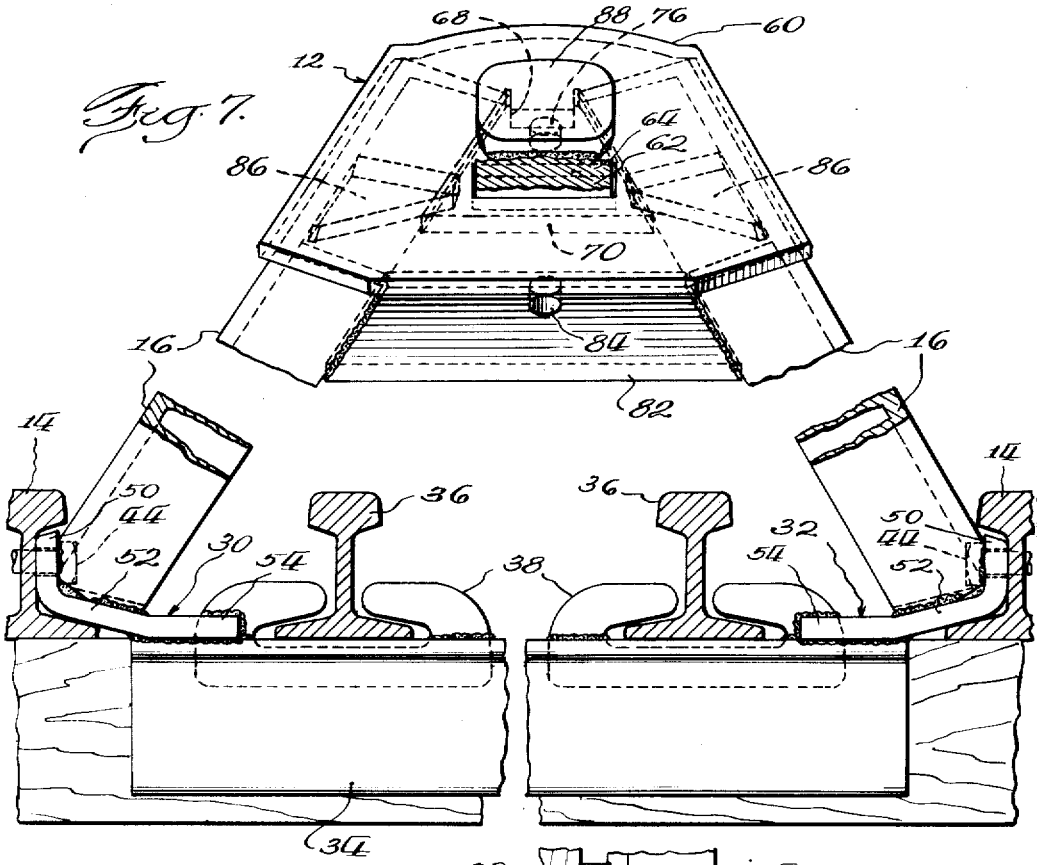
Fig. 7 is, in substance, a front elevation of the compression unit, the view being taken along the line 7—7 of Fig. 2.

The construction of the tension unit is illustrated particularly in Figs. 4, 5, 6 and 10 to 12, inclusive. Of these, Figs. 4 to 6 illustrate especially the construction of the bumper head, and Figs. 10 to 12, inclusive, illustrate the construction of the tension track fixture plates 26 and the connection of the divergent tension members 20 and 22 (these members, it should be remembered, are portions of the integral element 18) thereto and to the tension cross piece 24.

The bumper head 12 is constructed as a unit with the tension unit. It comprises a striking plate 90 of rectangular shape and secured to the tension member so that it is disposed substantially vertically when the bumping post is installed on the track, as illustrated best in Figs. 1 and 2. The striking plate is secured to the tension unit primarily by means of a pair of vertically disposed supporting plates 92 and 94. The rear sides of these plates are cut to provide angularly disposed surfaces 96 and 98 to facilitate the welding thereof to the interior and front surfaces 100 and 102 of the tension bar, which is of substantially rectangular cross-section, as illustrated in Figs. 4 to 6. The plates 92 and 94 are substantially the same except for slight differences occasioned by reason of the off-center support of the bumper head. The upper end of the bumper head is closed by a substantially horizontally disposed plate 104, and the rear end of the upper portion is closed by a pair of substantially triangular piece 106. The plate 104 and triangular pieces 106 are welded to the adjacent structures and, consequently, add to the rigidity and strength of the bumper head.

Additional strength is imparted to the bumper head by a pair of vertically disposed, generally triangular supporting plates 108 and 110. These plates also act as supporting means for the connecting plate 64 which, it may be noted from Figs. 4 to 6, is secured thereto at an angle such that the connecting plate is in the plane of the compression unit when the post is assembled. Further strength is imparted to the bumper head by a pair of spacing blocks 112 and 114 located between and welded to the plates 92 and 108 and the plates 94 and 110, respectively. It should be understood that the various plates and blocks described above are also welded to the striking plate 90, as illustrated in part in Figs. 4 and 6.

The lower ends of the tension members 20 and 22 are connected directly to the tension cross piece 24 so that the vertical stresses resulting from an impact of the car against the bumping post are transmitted directly to the bases of the rails 14. This construction is illustrated particularly in Figs. 10, 11 and 12, to which reference is now had. The portions 20 and 22 of the tension bar 18 extend below the bases of the rails 14, as well as below the track fixture plates 26 and 28. The track fixture plates 26 and 28, like the compression track fixtures, are provided with apertured vertically disposed portions 120 whereby they may be secured to the webs of the rails 14 by the fastening means 44; intermediate inclined portions 122 overlying the rail bases; and with horizontally disposed portions 124 welded directly to the upper surface of the tension cross piece 24, which preferably takes the form of an angle iron as illustrated best in Fig. 12. The track fixture plates are made relatively long so that the rear portions 126 (see Fig. 11) rest on a rail tie while the front portions are welded to the cross piece. The central inner portions of the track fixture plates are cut away, as indicated by reference character 128, so that the lower ends of the tension members may extend therethrough below the fixture plates. The described construction permits the lower ends of the tension bar to be welded directly to the fixture plates as well as to the vertically disposed portion of the cross piece 24. To insure the transmission of the vertical stresses to the base of the rail, the cross piece 24 is made of a length (see Fig. 10) such that the outer ends thereof are located below the bases of the rails 14.

Figure 12:
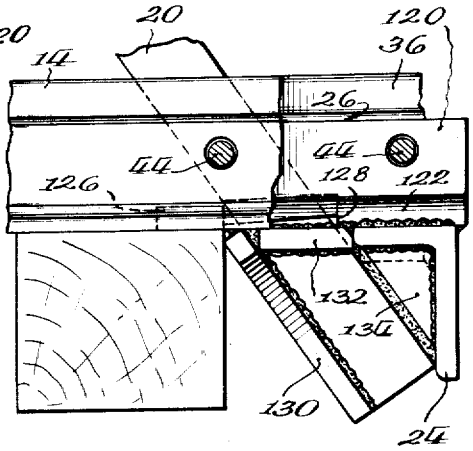
Fig. 12 is a side elevation, partly broken away, of one of the tension joints.
Figure 13:
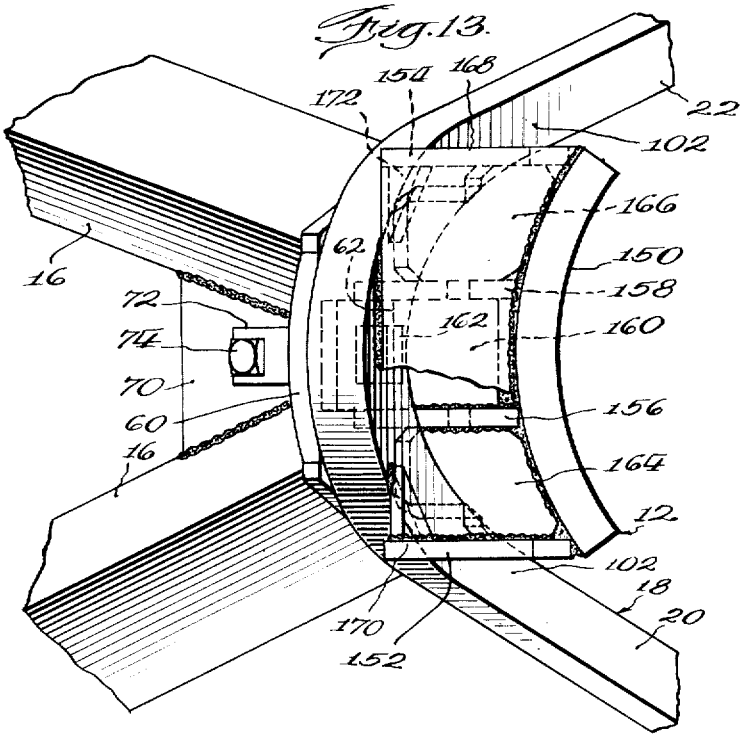
Fig. 13 is a fragmentary plan view, partly broken away, of another embodiment of the present invention.
Figure 14:
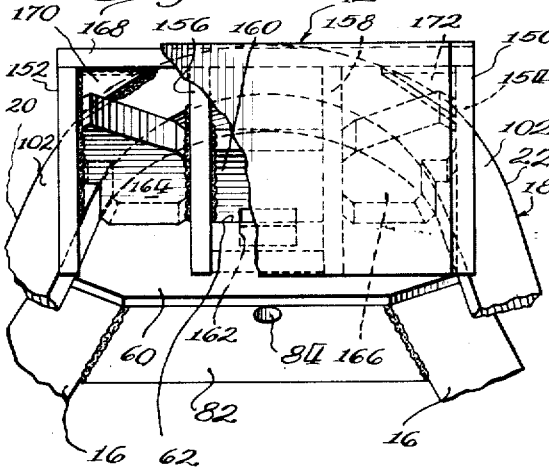
Fig. 14 is a front elevation, partly broken away, of the structure shown in Fig. 13.
Figure 15:
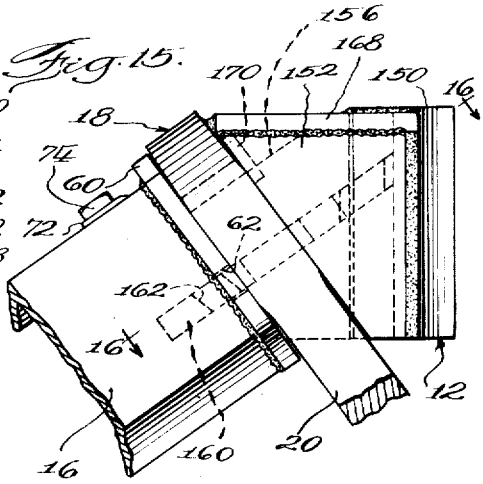
Fig. 15 is a side elevation of the structure shown in Fig. 13.

The strength of the tension track joint is further enhanced by utilization of generally triangular braces 130 welded to the undersides of the lower ends of the portions 20 and 22 of the tension bar, and the upper ends of which are adapted to abut against a rail tie as shown in Fig. 12. Further strength is imparted to the joint by utilization of generally rectangular spacing blocks 132, welded to the lower ends of the tension bar and to the upper adjacent ends of the cross piece 24 and supporting plates 130, and by generally triangular spacing blocks 134 located between and welded to the lower ends of the tension bar and cross piece 24.

Figure 10:
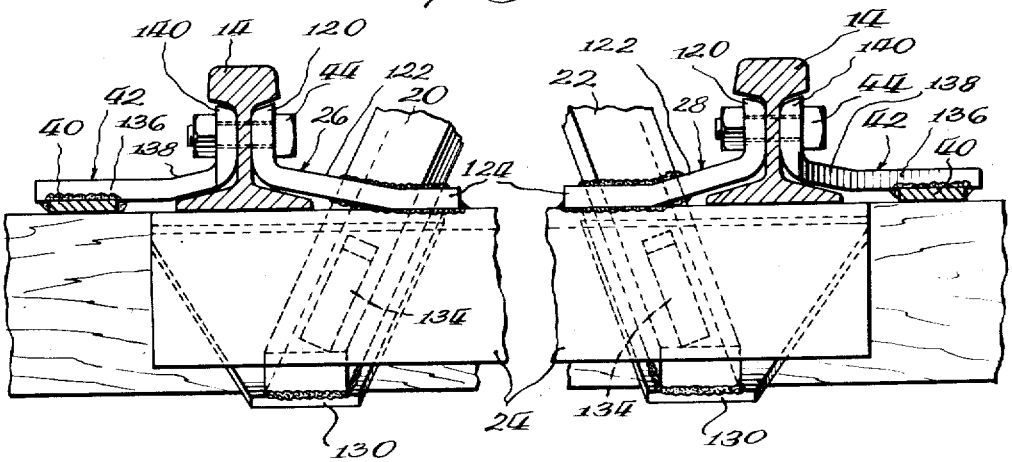
Fig. 10 is a front elevation of the tension joints and anchoring means.
Figure 11:
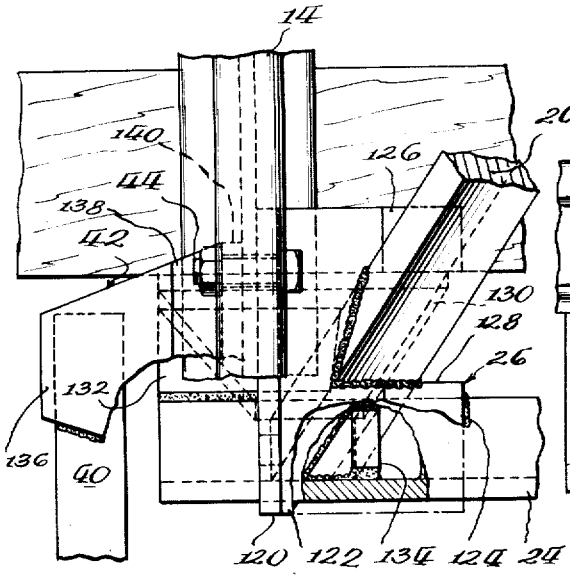
Fig. 11 is a plan view, partly broken away, of one of the tension joints and anchoring means illustrated in Fig. 9.

The construction of the anchor bars 40 and brackets 42 is best illustrated in Figs. 10 and 11. From these it may be noted that the forward end of the anchor bar is secured to the underside of a horizontal portion 136 of the bracket 42 so that the bar lies on the ties to which it may be secured by spikes, as previously indicated. It is preferred to weld the bars to the horizontal portions, as indicated, but other securing means, such as pins or bolts, may be used to provide greater flexibility between the bars and brackets. The bracket 42 is provided with an inclined intermediate portion 138 and an apertured, vertically disposed portion 140 so cut that the brackets may be secured to the webs of the rails contemporaneously with and in a manner identical with the track fixtures.

A modified form of bumper head, comprising a curved striking plate, is illustrated in Figs. 13 to 16, inclusive. The striking plate, which is indicated by reference character 150, is secured to the tension bar 18 mainly by a pair of generally triangular, substantially vertically disposed plates 152 and 154 welded to the front surface 102 of the bar. The striking plate is further supported by a pair of spaced-apart, generally triangular, and substantially vertically disposed plates 156 and 158 between which the connecting plate 160 is secured. The connecting plate is provided with an aperture 162 corresponding to the aperture 71 of connecting plate 64. The supporting plates 152 and 156 and the plates 154 and 158 are spaced by suitably configured spacing blocks 164 and 166, respectively, which correspond to the spacing blocks 112 and 114 of the previously described embodiment. The top of the bumper head is closed by a flat plate 168 and the rear of the bumper head is closed by a pair of generally triangular blocks 170 and 172. The various plates and blocks are secured in place by welding.

From the foregoing it may be seen that the bumping post of the present invention may be fabricated very simply, as by welding, from parts cut by a torch or the like. The bumping post of the invention is not only adapted readily to be fabricated, but it also provides a substantial structure well able to withstand the heavy impacts to which it is subject in use. Furthermore, the bumping post comprises separable tension and compression units which can be handled separately and which can be readily assembled and secured together by the slot and wedge connection with a minimum of difficulty.

What I claim as new and useful and desire to secure by United States Letters Patent is as follows:

1. A bumping post, including in combination, two separable sections each having means for connection to opposite points in track rails, one of said sections serving as a compression unit and the other as a tension unit, and means including a projection from one of said sections receivable in an aperture in the other of said sections for locating said sections with respect to each other and for removably securing the two sections together in interlocking relationship.

2. A bumping post, including in combination, two separable sections each having means for connection to opposite points in track rails, one of said sections serving as a compression unit and the other as a tension unit, and means for removably securing the two sections together in interlocking relationship, said last mentioned means including an apertured member forming part of one of said sections and a member forming part of the other section projecting through the apertured member for locating said sections with respect to each other and securing said sections together.

3. A bumping post, including in combination, two separable sections each having means for connection to opposite points in track rails, one of said sections serving as a compression unit and the other as a tension unit, and means for removably securing the two sections together in interlocking relationship, said last mentioned means including an apertured member forming part of the compression unit, a member forming part of the tension unit projecting through said apertured member, said last mentioned member and compression unit being provided with aligned apertures, and wedge-like means adapted to be inserted through said aligned apertures.

4. A bumping post, including in combination, two separable sections each having means for connection to opposite points in track rails, one of said sections including a bumper head and serving as a tension unit and the other as a compression unit, and means for removably securing the two sections together in interlocking relationship.

5. A bumping post, including in combination, two separable sections each having means for connection to opposite points in track rails, *a forward* one of said sections serving as a tension unit and [the other] *a rear one* as a compression unit, the upper end[s] of *each of* said sections comprising *a* relatively flat portion[s] disposed [one] in the plane of the tension unit and [one in the plane of the compression unit, whereby] *located so that* the post may be assembled by placing said portions in parallel abutting relationship *and with the flat portion of the tension unit overlying the flat portion of the compression unit,* and means for removably securing the two sections together.

6. A bumping post, including in combination, two separable sections each having means for connection to opposite points in track rails, one of said sections including a bumper head and serving as a tension unit and the other as a compression unit, the upper ends of said sections comprising relatively flat portions disposed in the plane of said tension unit, whereby the post may be assembled by placing said portions in abutting relationship, and means including a member projecting from the tension unit into the compression unit for removably securing the two sections together in interlocking relationship.

7. A bumping post, including in combination, two separable sections each having means for connection to opposite points in track rails, one of said sections including a single bar curved substantially into V-shape and disposed in inverted position and serving as a tension unit, the other of said sections serving as a compression unit, the upper ends of said sections comprising relatively flat portions disposed in the plane of said tension unit, whereby the post may be assembled by placing said portions in abutting relationship, and means including a member projecting from the tension unit into the compression unit for removably securing the two sections together in interlocking relationship.

8. A bumping post, including in combination, two separable sections each having means for connection to opposite points in track rails, one of said sections including a single bar curved substantially into V-shape and disposed in inverted position and serving as a tension unit, the other of said sections serving as a compression unit, and means for securing the two sections together in abutting relationship with said tension unit in front of said compression unit and in a plane substantially perpendicular to the plane of the compression unit.

9. A bumping post, including in combination, two separable sections each having means for connection to opposite points in track rails, one of said sections serving as a tension unit and the other as a compression unit, said tension unit including a single bar curved into a substantially V-shaped form and disposed in inverted position and a bumper head secured to the upper end thereof forward of the bar, the upper end of said compression unit comprising a relatively flat surface disposed in the plane of said bar, whereby the post may be assembled by placing said bar in abutting relationship with said surface, and means for securing the two sections together.

10. A bumping post, including in combination, two separable sections each having means for connection to opposite points in track rails, one of said sections serving as a tension unit and the other as a compression unit, said tension unit including a single bar curved into substantially V-shape, a bumper head secured to the upper end thereof and a plate extending rearwardly of the bar, the upper end of said compression unit comprising a substantially flat apertured plate disposed in the plane of said bar, whereby the post may be assembled in interlocking relationship by placing said bar in abutting relationship to said plate and passing said first mentioned plate through the aperture in said second mentioned plate, and means including a locking member associated with said compression unit and first mentioned plate for removably securing the two units together.

11. A bumping post, including in combination, two separable sections, one of said sections serving as a tension unit, the other serving as a compression unit, said tension unit including a single bar of substantially rectangular cross section curved into substantially V-shape, said bar being disposed in inverted position and inclined rearwardly, a bumper head, means including a pair of plates welded to said bar for securing said bumper head to the upper portion of said bar, a plate integrally secured to the bumper head at an angle of inclination corresponding to that of the compression unit and extending rearwardly of the bar, said compression unit comprising a pair of divergent forwardly inclined structural elements, the upper ends of which are cut to correspond to the angle of inclination of the tension unit, a substantially flat apertured plate welded to the upper ends of said compression members, whereby the units may be assembled in interlocking relationship by placing said bar in abutting relationship to said plate and passing said first mentioned plate through the aperture in said second mentioned plate, means for removably securing the two units together, said means including a gusset plate secured to the apex of the compression unit and a wedge-like member, said gusset plate and rearwardly extending plate being provided with aligned apertures for the reception of said wedge-like member, means for securing said wedge-like member to the compression unit, and means including compression and tension cross pieces and track fixtures for securing the lower ends of the compression and tension units in stress transmitting relationship to opposite points in the track.

12. A bumping post, including in combination, two separable sections, one of said sections serving as a tension unit and the other serving as a compression unit, said tension unit including a single bar of substantially rectangular cross section curved into substantially V-shape, said bar being disposed in inverted position and inclined rearwardly, a bumper head, means including a pair of plates welded to the front and upper surfaces of said bar for securing said bumper head to the upper portion of said bar, a plate integrally secured to the bumper head and extending rearwardly of the bar, said compression unit comprising a pair of divergent forwardly inclined structural elements, the upper ends of which are cut to correspond to the angle of inclination of the tension unit, a substantially flat apertured plate welded to the upper ends of said compression members, whereby the units may be assembled in interlocking relationship by placing said bar in abutting relationship to said plate and passing said first-mentioned plate through the aperture in said second-mentioned plate, means including a locking member associated with said compression unit and first-mentioned plate for removably securing the two units together, and means including compression and tension cross pieces and track fixtures for securing the lower ends of the compression and tension units in stress transmitting relationship to opposite points in the track rails.

13. A bumping post, including in combination, two separable sections, one of said sections serving as a tension unit and the other serving as a compression unit, said tension unit including a single bar of substantially rectangular cross section curved into substantially V-shape, said bar being disposed in inverted position and inclined rearwardly, a bumper head, means including a pair of plates welded to the upper surface of said bar for securing said bumper head to the upper portion of said bar, a plate integrally secured to the bumper head and extending rearwardly of the bar, said compression unit comprising a pair of divergent forwardly inclined structural elements, the upper ends of which are cut to correspond to the angle of inclination of the tension unit, a substantially flat apertured plate welded to the upper ends of said compression members, whereby the units may be assembled in interlocking relationship by placing said bar in abutting relationship to said plate and passing said first-mentioned plate through the aperture in said second-mentioned plate, means including a locking member associated with said compression unit and first-mentioned plate for removably securing the two units together, and means including compression and tension cross pieces and track fixtures for securing the lower ends of the compression and tension units to the rails.

14. In a bumping post, a tension unit including in combination, a unitary tension member comprising a structural element curved into substantially V-shape and disposed in inverted position, and a bumper head secured to the upper portion thereof.

15. In a bumping post, a tension unit including in combination, a unitary tension member comprising a structural element curved into substantially V-shape and disposed in inverted position, a bumper head secured to the upper portion thereof and extending forwardly from said element, and a member secured to the upper portion of said element extending rearwardly from said element for locating said tension unit.

16. In a bumping post, a tension unit including in combination, a tension member comprising a structural element curved into substantially V-shape and disposed in inverted position at an angle to the rail bed, a bumper plate disposed transversely to the rail bed in a substantially vertical position, and means including spaced apart substantially vertically disposed plates welded to said bumper plate and structural element for securing the bumper plate to the upper portion of said element.

17. In a bumping post, a tension unit including in combination, a tension member comprising a structural element curved into substantially V-shape and disposed in inverted position at an angle to the rail bed, a bumper plate disposed transversely of the rail bed and substantially in vertical position, and means for securing said bumper plate to the upper portion of said element, said means including a pair of substantially vertically disposed plates welded to the outer vertical edges of said bumper plate and to said element, a pair of spaced apart plates intermediate said first pair of plates welded to said element and bumper plate, and spacing blocks between adjacent plates of each of said pairs and welded thereto.

18. In a bumping post, a tension unit including in combination, a tension member comprising a structural element curved into substantially V-shape and disposed in inverted position at an angle to said rail bed, a bumper plate disposed transversely to the rail bed and substantially in vertical position, and means for securing said bumper plate to the upper portion of said element, said means including a pair of substantially vertically disposed plates diverging outwardly from said plate toward the element and welded to the outer vertical edges of said bumper plate and to said element, a pair of spaced apart plates intermediate said first pair of plates welded to said element and bumper plate, spacing blocks between and welded to adjacent plates of each of said pairs, and a plate between and welded to said last-mentioned pair of plates, said last-mentioned plate extending beyond the side of the element opposite the bumper plate for cooperation with a compression unit.

19. In a bumping post, a tension unit including in combination, a tension member comprising a bar of substantially rectangular cross section curved into substantially V-shape and disposed in inverted position at an angle to the rail bed, a bumper plate disposed transversely of the rail bed in a substantially vertical position, and means including plates welded to said bumper plate and to the top surface of said bar for securing the bumper plate to the upper portion of said bar.

20. In a bumping post, a tension unit including in combination, a tension member comprising a bar of substantially rectangular cross section curved into substantially V-shape and disposed in inverted position at an angle to the rail bed, a bumper plate disposed transversely of said rail bed and substantially in vertical position, and means for securing said bumper plate to the upper portions of said bar, said means including a pair of substantially vertically disposed plates diverging outwardly from said plate toward the element and welded to the outer vertical edges of said bumper plate and to the front and top surfaces of said bar, a pair of spaced apart plates intermediate said first pair of plates welded to said bar and bumper plate, spacing blocks between and welded to adjacent plates of each of said pairs, and a plate between said last-mentioned pair of plates and welded thereto and the bumper plate, said spacing blocks and last-mentioned plate being disposed in a common plane, and said last-mentioned plate extending beyond the side of the bar opposite the bumper plate for cooperation with a compression unit.

21. In a bumping post, a tension unit including in combination, a tension member comprising a bar of substantially rectangular cross section curved into substantially V-shape and disposed in inverted position at an angle to the rail bed, a curved bumper plate disposed transversely of said rail bed and substantially in vertical position, means for securing said bumper plate to the upper portion of said bar, said means including a pair of substantially vertically disposed, generally triangular plates diverging outwardly from said plate toward the bar and welded to the outer vertical edges of said bumper plate and to the top surface of said bar, a pair of spaced apart plates intermediate said first pair of plates welded to said bar and bumper plate, spacing blocks between and welded to adjacent plates of each of said pairs of plates, and a plate between and welded to said last-mentioned pair of plates, said spacing blocks and last-mentioned plate being located in a common plane, and said last-mentioned plate extending beyond the side of the bar opposite the side of the bumper plate for cooperative relationship with a compression unit.

22. In a bumping post, a track joint including in combination, a track fixture plate having a portion adapted to be secured to the inside surface of a rail web, an inclined portion overlying the surface of the inclined upper surface of the rail base and a horizontal portion extending beyond the base of the rail, said horizontal portion being cut away intermediate its ends and along one edge, and a stress transmitting member extending below said plate through the cut away portion thereof and welded thereto.

23. In a bumping post, a tension track joint including in combination, a track fixture plate having a portion adapted to be secured to the inside surface of a rail web, an inclined portion overlying the surface of the inclined upper surface of the rail base and a horizontal portion extending beyond the base of the rail, said horizontal portion being cut away intermediate its ends and along one edge, a tension member extending below said plate through the cut away portion thereof and welded thereto, and a tension cross piece extending transversely of and below said horizontal portion and the base of the rail, said cross piece being welded to the horizontal portion of said track fixture plate and to said tension member.

24. In a bumping post, a tension track joint including in combination, a track fixture plate having a portion adapted to be secured to the inside surface of a rail web, an inclined portion overlying the surface of the inclined upper surface of the rail base and a horizontal portion extending beyond the base of the rail, said horizontal portion being cut away intermediate its ends and along one edge, a tension member extending below said plate through the cut away portion thereof and welded thereto, said member being inclined inwardly of the rail and rearwardly of the plate, a tension cross piece extending transversely of and below the base of the rail, said cross piece consisting of an angle iron disposed forwardly of the tension member and being welded to the under side horizontal portion of said track fixture plate and to the lower end of said tension member, a generally trapezoidal plate having its longer parallel side abutting against the rail base welded to the under side of the tension member, a spacing block welded to said trapezoidal plate and cross piece, and a generally triangular spacing block located between and welded to the tension member and both the horizontal and vertical portions of said cross piece.

25. In a bumping post, a tension unit including in combination, a pair of track fixture plates having portions adapted to be secured to the inside surfaces of rail webs, inclined portions overlying the surface of the inclined upper surfaces of the rail bases and horizontal portions extending beyond the bases of the rails, said horizontal portions being cut away intermediate their ends and along their inner edges, tension members extending below said plates through the cut away portions thereof and welded thereto, and a tension cross piece extending transversely of and below the base of the rail, said cross piece being welded to the horizontal portion of said track fixture plates and to said tension members.

26. In a bumping post, a tension unit including in combination, a pair of track fixture plates having portions adapted to be secured to the inside surfaces of rail webs at opposite points on a pair of rails, inclined portions overlying the surfaces of the inclined upper surfaces of the rail bases and horizontal portions extending beyond the bases of the rails, said horizontal portions being cut away intermediate their ends and along their inner edges, a tension member comprising a single bar curved into substantially V-shape and disposed in inverted position with the lower ends thereof extending below said plate through the cut away portion thereof and welded thereto, a tension cross piece extending transversely of and below the base of the rail, said cross piece being welded to the horizontal portion of said track fixture plate and to said tension member, and a bumper head secured to the upper end of said tension member.

27. In a bumping post, a compression track joint including in combination, a track fixture plate having a portion adapted to be secured to the inside surface of a rail web, an inclined portion overlying the surface of an inclined upper surface of the rail base and a horizontal portion extending beyond the base of the rail, and a compression member having its lower end configured to abut on the inner side of said fixture plate and welded directly thereto.

28. In a bumping post, a compression unit including in combination, a pair of divergent compression members secured together at their convergent ends, and means for securing the opposite ends of said members to opposite points on a pair of rails, said last-mentioned means each including a track fixture plate having a portion adapted to be secured to the inside surface of a rail web, an inclined portion overlying the surface of an inclined upper surface of the rail base and a horizontal portion extending beyond the base of the rail, and a compression member having its lower end configured to abut on the inner side of said fixture plate and welded directly thereto.

29. In a bumping post, a compression unit including in combination, a pair of divergent compression members, and means for securing together the convergent ends of said members, said means including a substantially flat plate disposed at an angle with respect to said compression members corresponding to the angle of a tension unit with which the compression unit is to be used.

30. In a bumping post, a compression unit including in combination, a pair of divergent compression members, and means for securing together the convergent ends of said members, said means including a substantially flat, apertured plate disposed at an angle with respect to said compression members corresponding to the angle of a tension unit with which the compression unit is to be used.

31. In a bumping post, a compression unit including in combination, a pair of divergent compression members the upper ends of which are cut at an angle corresponding to the angle of a tension unit with which the compression unit is to be utilized, means for securing the convergent ends of said members, said means including a substantially flat plate, and means including a surface projecting outwardly from said plate for locating said compression unit with respect to the tension unit.

32. In a bumping post, a compression unit including in combination, a pair of divergent compression members, said compression members comprising channels having their open sides facing each other, and the upper ends of which are cut at an angle corresponding to the angle of a tension unit with which the compression unit is to be utilized, and means for securing the convergent ends of said members, said means including a substantially flat plate welded to the upper ends of said members, a bottom gusset plate of generally trapezoidal configuration welded to the lower end of said first-mentioned plate and to one side of each of said channels, a top gusset plate welded to the adjacent edges of the other sides of said channels, and substantially triangular braces welded to said first-mentioned plate and to the bottoms of said channels.

33. In a bumping post, a compression unit including in combination, a pair of divergent compression members, said compression members comprising channels having their open sides facing each other and the upper ends of which are cut at an angle corresponding to the angle of a tension unit with which the compression unit is to be utilized, and means for securing the convergent ends of said of said members, said means including a substantially flat plate welded to the upper ends of said members, a bottom gusset plate of generally trapezoidal configuration welded to the lower side of said first-mentioned plate and to the adjacent lower sides of each of said channels, a top gusset plate welded to the adjacent edges of the upper sides of said channels and substantially triangular braces welded to said first-mentioned plate and to the bottoms of said channels, said first-mentioned plate and top gusset plate being apertured for the reception of an interlocking member of a tension unit and locking means, respectively.

34. In a bumping post, a compression unit including in combination, a pair of divergent compression members, said compression members comprising channels having their open sides facing each other and the upper ends of which are cut at an angle corresponding to the angle of a tension unit with which the compression unit is to be utilized, means for securing the convergent ends of said members, said means including a substantially flat plate welded to the upper ends of said members, a bottom gusset plate of generally trapezoidal configuration welded to the lower side of said first-mentioned plate and to the adjacent lower sides of each of said channels, a top gusset plate welded to the adjacent edges of the upper sides of said channels and substantially triangular braces welded to said first-mentioned plate and to the bottoms of said channels, said first-mentioned plate and top gusset plate being apertured for the reception of an interlocking member of a tension unit and locking means, respectively, a relatively small plate welded to the outer surface of said substantially flat plate above the aperture therein for locating and supporting the tension unit, means for securing the divergent ends of said compression members to opposite points on a pair of rails, said last-mentioned means each including a track fixture plate having a portion adapted to be secured to the inside surface of the rail web, an inclined portion overlying the surface of an inclined upper surface of the rail base and a horizontal portion extending beyond the base of the rail, the lower ends of the compression members being configured to abut against the portion of the plate secured to the inside surface of the rail web and said inclined portion, a cross piece having a portion adapted to extend vertically downward below the base of the rail welded to the horizontal portions of said track fixtures, and a pair of spaced apart integral rail base encircling clips welded to said downwardly extending portions of said cross piece.

References Cited in the file of this patent or the original patent

UNITED STATES PATENTS

| | | |
|---|---|---|
| 1,104,332 | Waugh | July 21, 1914 |
| 1,187,851 | Lawrence | June 20, 1916 |
| 1,747,006 | Hayes | Feb. 11, 1930 |
| 1,910,990 | Hayes | May 23, 1933 |
| 2,053,556 | Hayes | Sept. 8, 1936 |
| 2,073,694 | Hayes | Mar. 16, 1937 |